US009829089B2

(12) United States Patent
Yamada et al.

(10) Patent No.: US 9,829,089 B2
(45) Date of Patent: Nov. 28, 2017

(54) HYDRAULIC PRESSURE CONTROL APPARATUS

(71) Applicants: KEIHIN CORPORATION, Tokyo (JP); Fuji Heavy Industries Ltd., Tokyo (JP)

(72) Inventors: Kouichi Yamada, Miyagi-ken (JP); Kenji Suda, Sendai (JP); Tomotaka Terajima, Chofu (JP); Susumu Ito, Kiyose (JP)

(73) Assignees: KEIHIN CORPORATION, Tokyo (JP); FUJI HEAVY INDUSTRIES LTD., Tokyo (JP)

( * ) Notice: Subject to any disclaimer, the term of this patent is extended or adjusted under 35 U.S.C. 154(b) by 0 days.

(21) Appl. No.: 15/287,315

(22) Filed: Oct. 6, 2016

(65) Prior Publication Data

US 2017/0023129 A1    Jan. 26, 2017

Related U.S. Application Data

(62) Division of application No. 14/290,289, filed on May 29, 2014, now Pat. No. 9,488,268.

(30) Foreign Application Priority Data

May 30, 2013  (JP) ................................ 2013-114731
May 30, 2013  (JP) ................................ 2013-114732

(51) Int. Cl.
*F16H 61/00*   (2006.01)
*F16K 11/07*   (2006.01)
*F16K 31/06*   (2006.01)

(52) U.S. Cl.
CPC ..... *F16H 61/0021* (2013.01); *F16H 61/0009* (2013.01); *F16K 11/0716* (2013.01);
(Continued)

(58) Field of Classification Search
CPC ............ F16H 61/0009; F16H 61/0021; F16H 61/0025; Y10T 137/86485; Y10T 137/794;
(Continued)

(56) References Cited

U.S. PATENT DOCUMENTS 4,889,036 A   12/1989   Yoshikawa et al.
5,669,479 A    9/1997   Matsufuji
(Continued)

FOREIGN PATENT DOCUMENTS

JP   47-017221   10/1972
JP   50-059821    5/1975
(Continued)

OTHER PUBLICATIONS

Machine Translation of JP61278601 (retrieved Apr. 12, 2017).*
(Continued)

*Primary Examiner* — Michael R Reid
(74) *Attorney, Agent, or Firm* — Rankin, Hill & Clark LLP

(57) ABSTRACT

A hydraulic pressure control apparatus includes a first pressure regulating valve for reducing an initial oil pressure (line pressure) of a working oil, a solenoid-operated valve for converting the oil pressure, which has been reduced in pressure, into a solenoid pressure, and a second pressure regulating valve for converting the line pressure of the working oil into an actuating pressure responsive to the solenoid pressure. The three valves share a single body. Further, an outlet passageway is formed along a thicknesswise direction of the body, with a relief valve being formed upwardly of the outlet passageway.

8 Claims, 11 Drawing Sheets

(52) U.S. Cl.
CPC ....... F16K 31/0613 (2013.01); *Y10T 137/794* (2015.04); *Y10T 137/86485* (2015.04)

(58) Field of Classification Search
CPC ..... Y10T 137/87917; Y10T 137/86767; Y10T 137/86734; Y10T 137/88046; Y10T 137/88054; Y10T 137/87885; Y10T 137/87829; Y10T 137/87837; Y10T 137/86759; Y10T 137/87322
USPC ........... 137/544, 624.27, 614, 625.34, 625.3, 137/614.19, 614.2, 884, 877, 878, 625.33, 137/599.08
See application file for complete search history.

(56) References Cited

U.S. PATENT DOCUMENTS

| | | | |
|---|---|---|---|
| 5,720,360 A | 2/1998 | Clark | |
| 2004/0045614 A1* | 3/2004 | Subramanian | ........ F15B 13/081 137/884 |
| 2007/0204923 A1* | 9/2007 | Da Pont | ................ A47L 15/421 137/613 |
| 2011/0073427 A1 | 3/2011 | Ishikawa | |

FOREIGN PATENT DOCUMENTS

| | | |
|---|---|---|
| JP | 56-035802 | 4/1981 |
| JP | 60-196405 | 10/1985 |
| JP | 61-278601 | 12/1986 |
| JP | 63-303204 | 12/1988 |
| JP | 05-345528 | 12/1993 |
| JP | 07-139324 | 5/1995 |

OTHER PUBLICATIONS

Japanese Office Action dated Feb. 14, 2017 (English translation included).
Japanese Office Action dated Feb. 21, 2017 (English translation included).

* cited by examiner

HYDRAULIC PRESSURE CONTROL APPARATUS

CROSS-REFERENCE TO RELATED APPLICATIONS

This application is based upon and claims the benefit of priority from Japanese Patent Applications No. 2013-114731 filed on May 30, 2013 and No. 2013-114732 filed on May 30, 2013, the contents all of which are incorporated herein by reference.

BACKGROUND OF THE INVENTION

Field of the Invention

The present invention relates to a hydraulic pressure control apparatus, which attains an actuating pressure for controlling a clutch or the like from an initial pressure (line pressure) of a working oil that is input to an input port, and to a hydraulic pressure control apparatus having a relief valve, which is capable of being opened if the pressure of the working oil becomes equal to or greater than a predetermined threshold value.

Description of the Related Art

As one type of hydraulic pressure control apparatus that is mounted in an automobile for use with a clutch, the hydraulic pressure control apparatus disclosed in Japanese Laid-Open Patent Publication No. 05-345528 is known. The hydraulic pressure control apparatus includes a differential clutch control valve and a solenoid modulator valve that function as pressure regulating valves, and a single linear solenoid-operated valve. An initial pressure (line pressure) of the working oil is reduced to a predetermined pressure by the solenoid modulator valve, and the reduced oil pressure is supplied to the linear solenoid-operated valve.

The linear solenoid-operated valve generates a solenoid pressure based on an electric current that is supplied to the solenoid thereof, and the solenoid pressure is supplied to the differential clutch control valve. Based on the solenoid pressure, the differential clutch control valve converts the line pressure, and the working oil is supplied to the clutch under the converted pressure, which acts as a predetermined clutch pressure (actuating pressure).

According to Japanese Laid-Open Patent Publication No. 05-345528, among the three valves that function as described above, it has been proposed that the differential clutch control valve and the solenoid modulator valve are arranged in parallel facing relation to each other within a valve body, which is made up of a combination of a lower valve body and an upper valve body, whereas the linear solenoid-operated valve is arranged between the two pressure regulating valves, with the axis of the linear solenoid-operated valve extending perpendicularly to the two pressure regulating valves. Further, oil passageways for the working oil are defined in the upper valve body.

In a hydraulic pressure control apparatus having the aforementioned structure, in general, if the oil pressure rises above the predetermined pressure, in order to protect the oil pressure device, a relief valve is provided for allowing the working oil to escape outside of a working oil passage through which the working oil flows. As an example of this type of relief valve, reference may be made to the disclosure of Japanese Laid-Open Patent Publication No. 07-139324.

In the relief valve, a spherical valve element is resiliently biased toward a valve seat by a closing spring. In addition, if the pressure of the working oil that flows through the oil passageway exceeds the resilient force of the closing spring, the spherical valve element is pressed by the working oil together with compressing the closing spring, whereupon the spherical valve element separates away from the valve seat. Accordingly, the relief valve assumes a valve-open state, and as a result, the working oil is introduced into the body of the relief valve.

SUMMARY OF THE INVENTION

In Japanese Laid-Open Patent Publication No. 05-345528, although a concept is disclosed of providing three individual valves in a single valve body, as described above, the valve body itself is made up from two vertically assembled members. In addition, the linear solenoid-operated valve thereof extends in a direction perpendicular to the two pressure regulating valves, i.e., in a stacking direction of a lower valve body and an upper valve body.

Therefore, in the technique disclosed in Japanese Laid-Open Patent Publication No. 05-345528, a drawback is evident in that it is difficult for the dimension (thickness) in the stacking direction to be made smaller.

Further, with the relief valve disclosed in Japanese Laid-Open Patent Publication No. 07-139324, particularly as shown in FIGS. 1 and 3, a relief hole is formed at a position significantly distanced from a valve seat. Consequently, in order for working oil to be introduced to the interior of the body of the relief valve, the distance of a spherical valve body from the valve seat (a so-called lift amount) must be comparatively large.

Further, since the lift amount is large, the amount by which a closing spring is displaced upon compression thereof must also be large. Thus, as a necessity, as the closing spring, a spring must be used that has a large initial length prior to compression thereof.

For the reasons noted above, the length in the axial direction of the relief valve body in which the closing spring is accommodated cannot easily be shortened, and as a result, a reduction in size of the relief valve is difficult to achieve.

A principal object of the present invention is to provide a hydraulic pressure control apparatus in which a valve arrangement is adopted that enables a reduction in size.

Another object of the present invention is to provide a hydraulic pressure control apparatus, which can be reduced in size due to being equipped with a relief valve in which a valve body thereof is lifted only by a small amount.

According to an embodiment of the present invention, a hydraulic pressure control apparatus is provided, comprising a working oil passage including an inlet port, a first pressure regulating valve configured to reduce an initial oil pressure of a working oil introduced from the inlet port, a solenoid-operated valve supplied with an electric current and a reduced oil pressure, the oil pressure reduced by the first pressure regulating valve, the solenoid-operated valve configured to convert the reduced oil pressure into a solenoid pressure in accordance with the supplied electric current, and a second pressure regulating valve supplied with the solenoid pressure from the solenoid-operated valve, the second pressure regulating valve converting the initial oil pressure of the working oil introduced from the inlet port into an actuating pressure in accordance with the solenoid pressure. In the hydraulic pressure control apparatus, a first valve hole, a second valve hole and a third valve hole, axes of which are arranged in parallel along a horizontal direction, are formed in a single body, and a first valve rod of the first pressure regulating valve, a second valve rod of the solenoid-operated valve and a third valve rod of the second pressure regulating valve are accommodated reciprocally in each of the first valve hole, the second valve hole and the third valve hole, and the first valve hole is interposed between the second valve hole and the third valve hole, and the first pressure regulating valve is arranged between the solenoid-operated valve and the second pressure regulating valve.

More specifically, with the hydraulic pressure control apparatus, the respective axes of the three valves are arranged mutually in parallel along a horizontal direction. Therefore, in the hydraulic pressure control apparatus, the dimension in a direction other than the axial directions of the valves can be made small. Stated otherwise, a reduction in size of the hydraulic pressure control apparatus can be achieved.

Additionally, since the first pressure regulating valve is arranged centrally, and the solenoid-operated valve is located adjacent to the first pressure regulating valve, the outlet of the first valve hole and an inlet of the second valve hole can be arranged in close proximity to each other in the body. More specifically, the oil passageway connecting the first pressure regulating valve and the solenoid-operated valve can be shortened in length.

Further, the first pressure regulating valve and the second pressure regulating valve are also arranged adjacently. Although the working oil is supplied under high pressure to the first pressure regulating valve and the second pressure regulating valve, by arranging the first pressure regulating valve and the second pressure regulating valve adjacently, the oil passageway connecting the working oil inlet of the first valve hole and the working oil inlet of the third valve hole can be made shorter in length.

The aforementioned features also contribute to reducing the length of the oil passageways, and hence lead to a reduction in the size of the hydraulic pressure control apparatus. Further, since the oil passageways are reduced in length, the working oil flows rapidly in the body and quickly reaches the downstream side of the valves. Therefore, the respective valves produce an improvement in response speed.

In the body, plural fastener insertion holes are formed. Plural fasteners (e.g., connecting bolts) are inserted into the plural fastener insertion holes for fastening the body to a given member. In the present invention, as noted above, the first pressure regulating valve and the second pressure regulating valve to which the working oil is supplied under high pressure are arranged adjacent to each other. Consequently, it is preferable for the distance (pitch) between the fasteners in the vicinity of the first valve hole and the third valve hole to be small. Owing thereto, since the surface pressure in the vicinity of the first valve hole and the third valve hole, to which the working oil is supplied under high pressure, is large, sealing performance can be ensured. Moreover, for this reason as well, the distance between the fastener insertion holes in the vicinity of the first valve hole and the third valve hole should be kept small.

Since the solenoid-operated valve (second valve hole) is kept under a comparatively low pressure, it is unlikely that working oil will leak out therefrom. Thus, so long as adequate sealing performance can be ensured, a greater distance may exist between the fastener insertion holes in the vicinity of the second valve hole.

An outlet passageway configured to release the working oil under the actuating pressure from the third valve hole, and an outlet port, which is contiguous with a downstream side of the outlet passageway and opens on an end face of the body, are formed in the body. The outlet passageway preferably is formed in a straight line extending from the outlet port in a thicknesswise direction of the body, and is perpendicular with respect to the third valve hole.

In this case, the working oil released from the third valve hole can be led out to the exterior of the body through the outlet port and the outlet passageway, which extends in the thicknesswise direction of the body. More specifically, there is no need to provide oil passageways on the end face of the body for passage of the working oil that is led out from the third valve hole. For this reason, the outlet passageway can be shortened in length. Naturally, this feature also contributes to reducing the size of the hydraulic pressure control apparatus.

Further, since the outlet passageway can be made shorter in length, the pressure responsiveness of a downstream side device, for example, a clutch, which is connected to the output port, can be improved.

Incidentally, in the case that an orifice is provided in the inlet passageway, the inlet passageway must have a sufficient length to accommodate the orifice. This is because, if the inlet passageway were short, an orifice could not be provided therein. However, if the inlet passageway were made greater in length for this purpose, the body would necessarily become larger in size to make room for the increased length.

Thus, in the present invention, preferably, an inlet passageway contiguous with a downstream side of the inlet port extends in a straight line in a thicknesswise direction of the body, an oil passageway is arranged in the body, the oil passageway has defined therein a first valve hole line pressure inlet and a third valve hole line pressure inlet, the first valve hole line pressure inlet communicates with the inlet passageway and is configured to introduce the working oil as an initial oil pressure to the first valve hole, and the third valve hole line pressure inlet is configured to introduce the working oil as the initial oil pressure to the third valve hole. Further, preferably, the inlet passageway and the oil passageway communicate via a communication passageway, and the communication passageway is inclined with respect to the thicknesswise direction of the body.

By way of the inclined communication passageway, for example, compared to a case in which a horizontal hole is formed to extend along the axial direction, the length in the thicknesswise direction of the body can be made shorter. Thus, an increase in size of the body commensurate with such an amount can be avoided.

Further, a filter is arranged in the inlet port, and an orifice that acts to restrict the flow rate of the working oil is arranged in the communication passageway. More specifically, the orifice is arranged downstream of the filter (or stated otherwise, the filter is arranged upstream of the orifice).

Because the passageway area is narrowed by the orifice, after having passed through the orifice, the flow rate of the working oil rises in comparison to the flow rate thereof prior to passing through the orifice. In the above structure, the working oil does not come into contact with the filter at the increased flow rate. Rather, the filter is arranged on the upstream side of the orifice, and thus an excessive burden is not imposed on the filter.

An oil passageway preferably is provided in the body, in which there are defined a first valve hole outlet configured to release the working oil having the reduced oil pressure out from the first valve hole, and a second valve hole inlet configured to introduce the working oil, which is released out from the first valve hole outlet, into the second valve hole. In this case, there is no need for the member in which the oil passageway is provided to be produced separately from the body. Accordingly, the structure of the hydraulic pressure control apparatus is simplified.

The first valve hole (first pressure regulating valve) and the second valve hole (solenoid-operated valve) are arranged adjacently. Accordingly, the first valve hole outlet and the second valve hole inlet are arranged in the oil passageway, and the oil passageway can also be formed in a straight linear shape. In this case as well, the oil passageway can be shortened, and hence the overall size of the hydraulic pressure control apparatus can be reduced.

For similar reasons to those mentioned above, even more preferably, an oil passageway is provided in the body, wherein in the oil passageway there are defined a second valve hole outlet configured to release the working oil under the solenoid pressure out from the second valve hole, and a solenoid pressure inlet configured to introduce the working oil, which is released out from the second valve hole outlet, into the third valve hole.

According to another embodiment of the present invention, a hydraulic pressure control apparatus is provided, comprising a working oil passage including an inlet port, a first pressure regulating valve configured to reduce an initial oil pressure of a working oil introduced from the inlet port, a solenoid-operated valve supplied with an electric current and a reduced oil pressure, the oil pressure reduced by the first pressure regulating valve, the solenoid-operated valve configured to convert the reduced oil pressure into a solenoid pressure in accordance with the supplied electric current, a second pressure regulating valve supplied with the solenoid pressure from the solenoid-operated valve, the second pressure regulating valve converting the initial oil pressure of the working oil introduced from the inlet port into an actuating pressure in accordance with the solenoid pressure, and a relief valve arranged in the working oil passage, the relief valve being openable to release the working oil out of the working oil passage when the pressure of the working oil in the working oil passage becomes equal to or greater than a predetermined threshold value of the relief valve. In the hydraulic pressure control apparatus, the first pressure regulating valve, the solenoid-operated valve, the second pressure regulating valve and the relief valve share a single body, the relief valve includes a valve element, a valve seat and a resilient member, the valve element is seated on or separated away from the valve seat, and the resilient member resiliently biases the valve element toward the valve seat, a relief chamber is defined in the body, and the relief chamber accommodates the valve element and the resilient member, a guide is configured to guide the valve element upon seating and separation of the valve element with respect to the valve seat, and the guide is formed in the body at an upstream side from the valve seat, and a relief hole is formed in the body between the valve seat and the guide, and the relief hole extends perpendicularly with respect to an axial direction of the body.

With this structure, the valve element receives the pressure of the working oil at a direction opposite to the direction in which the valve element is elastically biased. For this reason, the amount by which the valve element is lifted can be set at a desired amount.

Further, since the relief hole is provided immediately after the downstream side of the valve seat, the valve seat of the relief valve is arranged in close proximity to the relief hole. In other words, the distance between both members is small. Therefore, the lift amount of the valve element is small, and the amount by which the resilient member is deformed likewise is small.

For the foregoing reasons, as the resilient member, a member having a small initial length prior to compression thereof can be adopted. Thus, the region of the body in which the resilient member is accommodated can be reduced in size by a commensurate amount.

In this case, preferably, a groove is formed by partially removing a side wall portion of the guide, and the groove extends in an axial direction of the guide, for restricting (regulating) a displacement amount (lift amount) of the valve element.

In this case, since the working oil leaks from the groove if the valve element is displaced in excess of a predetermined displacement amount, the amount by which the valve element is raised is restricted. As a result, since a member can be adopted as the resilient member having a smaller initial length prior to compression thereof, the region of the body in which the resilient member is accommodated can be further reduced in size.

The relief valve, for example, can be arranged in an outlet passageway through which the working oil is led out under the actuating pressure from the second pressure regulating valve. In this case, in the hydraulic pressure control apparatus, an outlet passageway is formed in the body and is configured to release the working oil under the actuating pressure from the second regulating valve, and an outlet port opens on an end face of the body and is contiguous with a downstream side of the outlet passageway. Additionally, the relief valve may be arranged in the outlet passageway, and the valve element may separate away from the valve seat while the actuating pressure in the outlet passageway is equal to or greater than the predetermined threshold value of the relief valve, and the relief hole is in an open state when the valve element separates away from the valve seat.

In this manner, by placing the relief valve in an open state, supply of the working oil under high pressure to a device (for example, a clutch) on the downstream side of the hydraulic pressure control apparatus can be avoided. Accordingly, the aforementioned device can be protected.

In the hydraulic pressure control apparatus, preferably, the outlet passageway is formed in a straight line extending from the outlet port in the thicknesswise direction of the body, and the relief valve is formed in a straight line extending from the outlet passageway in the thicknesswise direction of the body on an opposite side from the outlet port. Further, an introduction port of the relief valve may communicate with the outlet passageway.

In this case, the working oil that is directed to the outlet passageway can be led out to the exterior of the body through the outlet passageway and the outlet port, which extend in the thicknesswise direction of the body. Together therewith, when the pressure of the working oil introduced to the outlet passageway is greater than a predetermined pressure, the working oil can be led out to the exterior of the hydraulic pressure control apparatus through the relief valve, which is arranged on one end side of the body. Consequently, there is no need to provide oil passageways configured to enable the working oil, which is directed to the outlet passageway, to flow toward the outlet port or the relief valve. For this reason, the outlet passageway can be shortened in length. This feature also contributes to reducing the size of the hydraulic pressure control apparatus.

In addition, the outlet passageway extends perpendicularly with respect to a valve hole of the second pressure regulating valve, and opens on a side wall of the valve hole. Therefore, the outlet passageway can be further shortened, and hence the hydraulic pressure control apparatus can be further reduced in size and weight.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A hydraulic pressure control apparatus according to a preferred embodiment of the present invention will be described in detail below with reference to the accompanying drawings.

Figure 1:
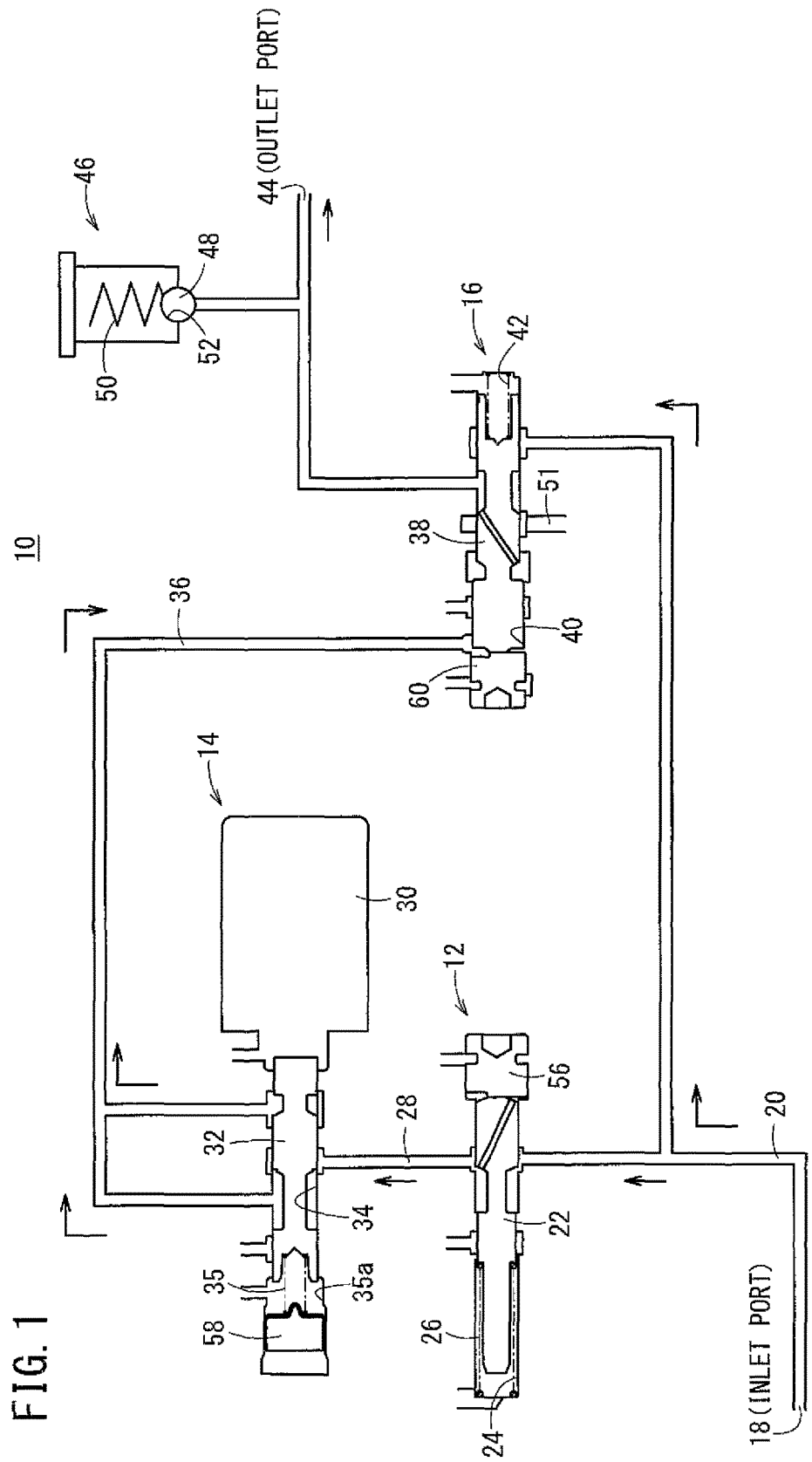
FIG. 1 is a system diagram of a hydraulic pressure control apparatus according to an embodiment of the present invention.

FIG. 1 is a system diagram of a hydraulic pressure control apparatus 10 according to an embodiment of the present invention. As shown in FIG. 1, the hydraulic pressure control apparatus 10 has a regulator valve 12 (first pressure regulating valve), a solenoid-operated valve 14, and a control valve 16 (second pressure regulating valve). Working oil is introduced from an inlet port 18 into a first oil passageway 20 by a non-illustrated oil pump, and then the working oil is distributed from the first oil passageway 20 to the regulator valve 12 and the control valve 16.

The regulator valve 12 functions to reduce the initial pressure (line pressure) of the working oil supplied from the inlet port 18 to a predetermined pressure. More specifically, the regulator valve 12 has a first valve rod 22 slidably arranged in a first valve hole 24, and which is resiliently biased under a resilient biasing force of a first pressure regulating spring 26, so as to normally close the regulator valve 12. The first valve rod 22 is movable back and forth in the first valve hole 24 in accordance with a difference in magnitude between the resilient biasing force of the first pressure regulating spring 26 and a feedback oil pressure that acts on the regulator valve 12. The first valve rod 22 stops at a position at which the resilient biasing force of the first pressure regulating spring 26 and the feedback oil pressure that acts on the first valve rod 22 are held in equilibrium, thereby regulating the oil pressure or depressurizing the working oil.

Under the reduced pressure, the working oil is supplied through a second oil passageway 28 to the solenoid-operated valve 14. The solenoid-operated valve 14 has a solenoid 30, which receives a command electric current supplied from a controller such as an ECU or the like. The solenoid 30 generates a thrust force in accordance with the value of the supplied command electric current. The solenoid-operated valve 14 also has a second valve rod 32 slidably arranged in a second valve hole 34. The second valve rod 32 is kept in a position at which the resilient biasing force of a second pressure regulating spring 35, which is housed in a spring chamber 35a, and a feedback oil pressure that acts on the second valve rod 32 are held in equilibrium, thereby regulating the oil pressure or depressurizing the working oil to a predetermined solenoid pressure.

Under the predetermined solenoid pressure, the working oil flows through a third oil passageway 36 to reach the control valve 16. The control valve 16 is supplied with the working oil, which is distributed under a line pressure from the first oil passageway 20. The control valve 16 has a third valve rod 38 slidably arranged in a third valve hole 40. The third valve rod 38 is kept in a position at which the resilient biasing force of a third pressure regulating spring 42 and a feedback oil pressure that acts on the third valve rod 38 are held in equilibrium, thereby regulating or reducing the line pressure, which is applied to the control valve 16, to a predetermined oil pressure. Under the reduced oil pressure, the working oil flows out of the control valve 16 and is discharged from an outlet port 44. From the outlet port 44, the working oil may be supplied to a non-illustrated clutch, for example.

An oil passageway extends from the control valve 16 to the outlet port 44, and a relief valve 46 is connected thereto, which prevents the working oil from being supplied from the outlet port 44 to the clutch if the pressure of the working oil, i.e., the clutch pressure from the clutch, becomes equal to or greater than a predetermined threshold pressure. More specifically, the relief valve 46 includes a spherical valve element 48 that normally is seated on a valve seat 52 under a resilient biasing force of a closing spring 50 (resilient member). If the clutch pressure becomes excessively high, the working oil presses the spherical valve element 48 against the resilient biasing force of the closing spring 50. When the spherical valve element 48 is unseated from the valve seat 52, thereby compressing the closing spring 50, the relief valve 46 opens in order to drain the working oil through the relief valve 46 and out of the hydraulic pressure control apparatus 10.

In FIG. 1, the reference numeral 51 denotes a drain in the control valve 16.

Structural details of the hydraulic pressure control apparatus 10 will be described below.

Figure 2:
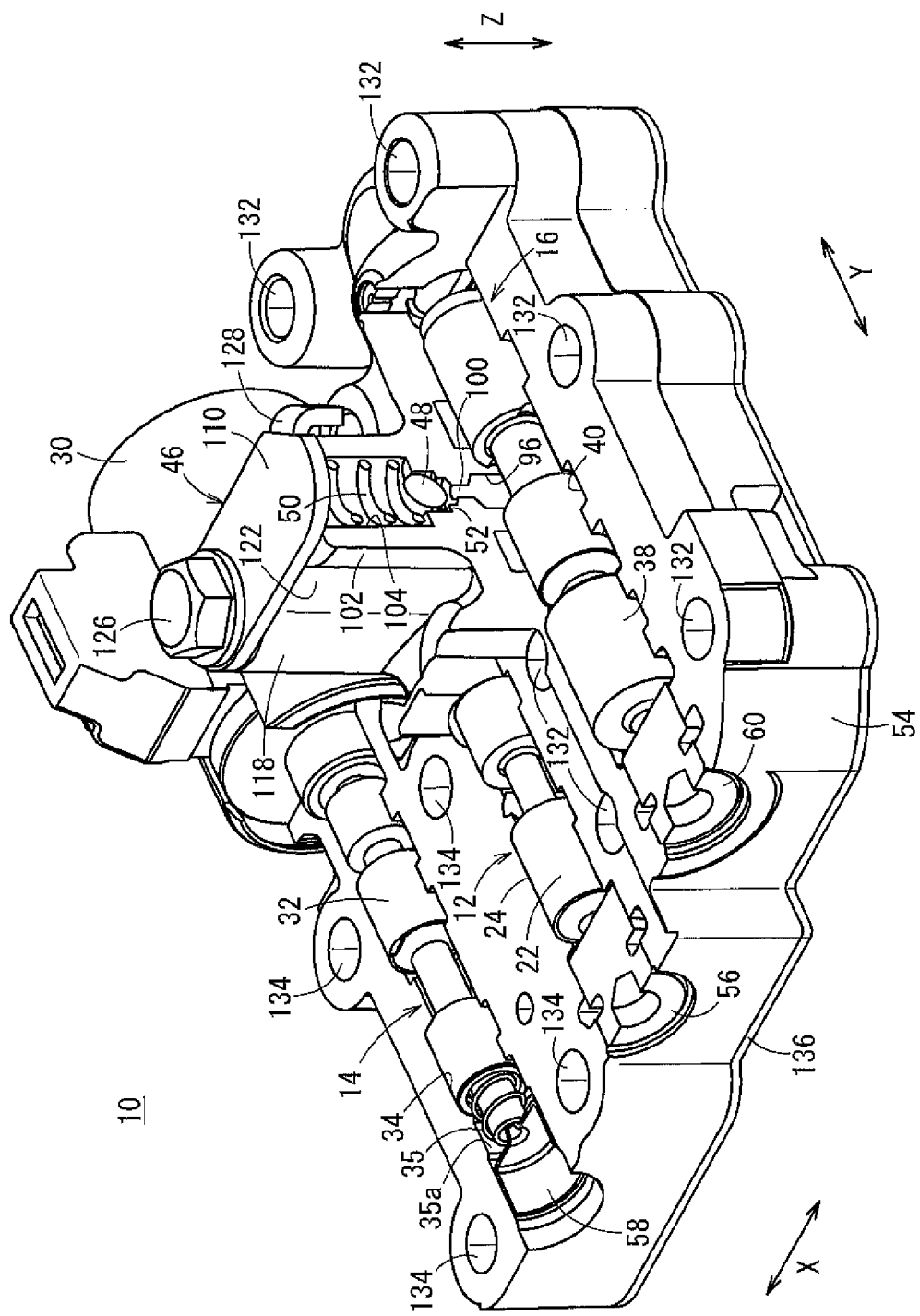
FIG. 2 is a perspective view, shown partially in horizontal cross section, of the hydraulic pressure control apparatus.
Figure 3:
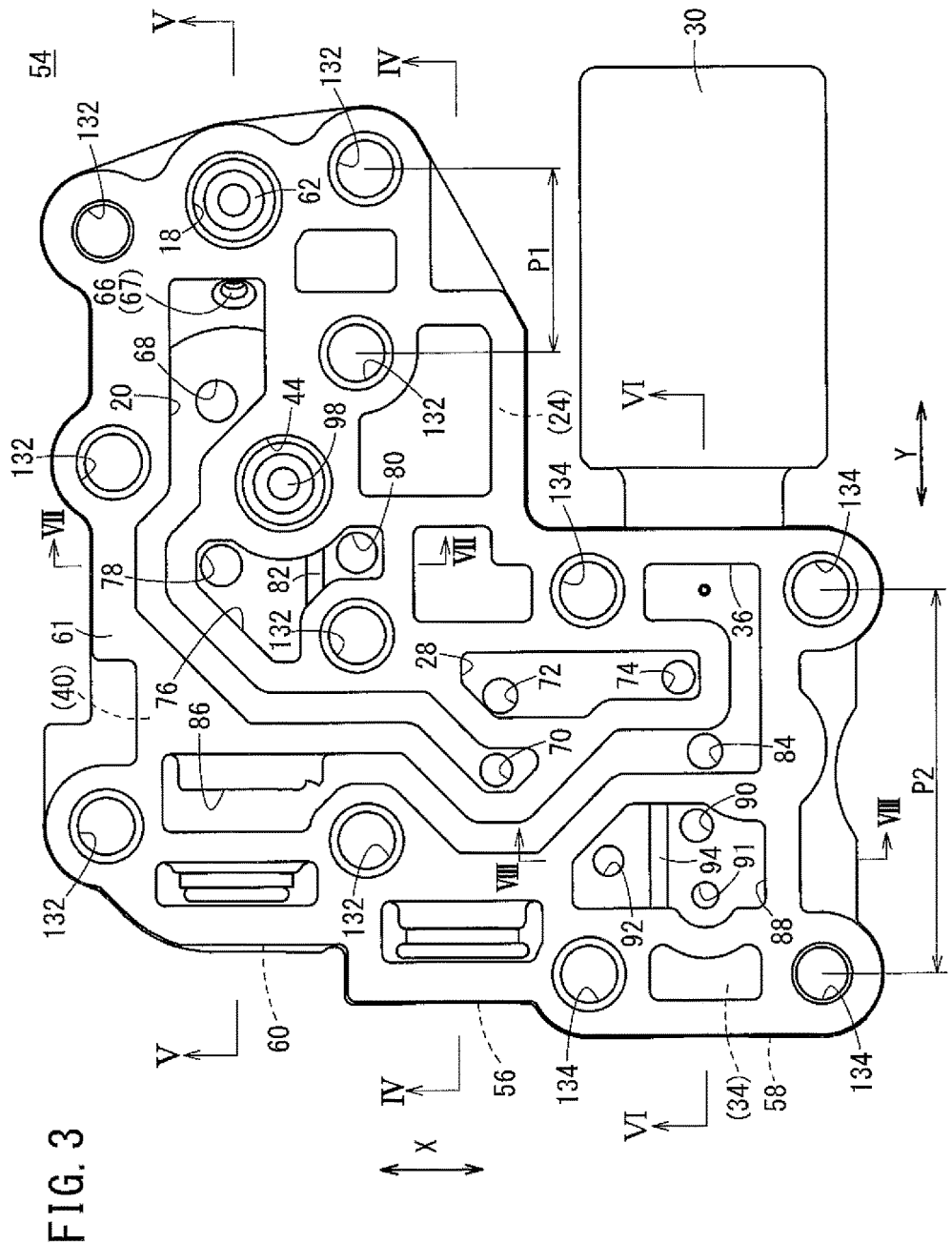
FIG. 3 is a plan view of an open end face of a body of the hydraulic pressure control apparatus.

FIG. 2 is a perspective view, shown partially in horizontal cross section, of the hydraulic pressure control apparatus 10. FIG. 3 is a plan view of an open end face of a body 54 of the hydraulic pressure control apparatus 10. In FIG. 2 and the other figures, widthwise, axial, and thicknesswise directions of the body 54 correspond to X, Y, and Z directions, respectively. The phrase "an open end face of the body 54" refers to an end face in which the first oil passageway 20, the second oil passageway 28, and the third oil passageway 36 are defined. The phrase "a closed end face of the body 54" refers to an end face on a side opposite from the open end face.

As shown in FIGS. 2 and 3, the regulator valve 12, the solenoid-operated valve 14, and the control valve 16 are arranged together in the single body 54 as a valve body. The solenoid-operated valve 14 and the control valve 16 are arranged at opposite ends of the body 54, respectively, on both sides of the regulator valve 12 which is interposed therebetween.

As shown in FIG. 2, the body 54 has the three valve holes 24, 34, 40 defined therein. The first valve hole 24 is positioned at the center of the body 54, and the second and third valve holes 34, 40 are arranged on opposite ends of the body 54. The first valve hole 24, the second valve hole 34, and the third valve hole 40 are juxtaposed with respective axes thereof arrayed parallel to each other along the widthwise direction, i.e., the horizontal direction (X direction) of the body 54.

The first valve rod 22 of the regulator valve 12 is housed in the first valve hole 24. The second valve rod 32 of the solenoid-operated valve 14 is housed in the second valve hole 34. The third valve rod 38 of the control valve 16 is housed in the third valve hole 40. Therefore, the regulator valve 12, the solenoid-operated valve 14, and the control valve 16 are juxtaposed with respective axes thereof arrayed in parallel to each other along the widthwise direction (X direction/horizontal direction) of the body 54. Each of the first valve rod 22, the second valve rod 32, and the third valve rod 38 comprises a spool.

Figure 4:
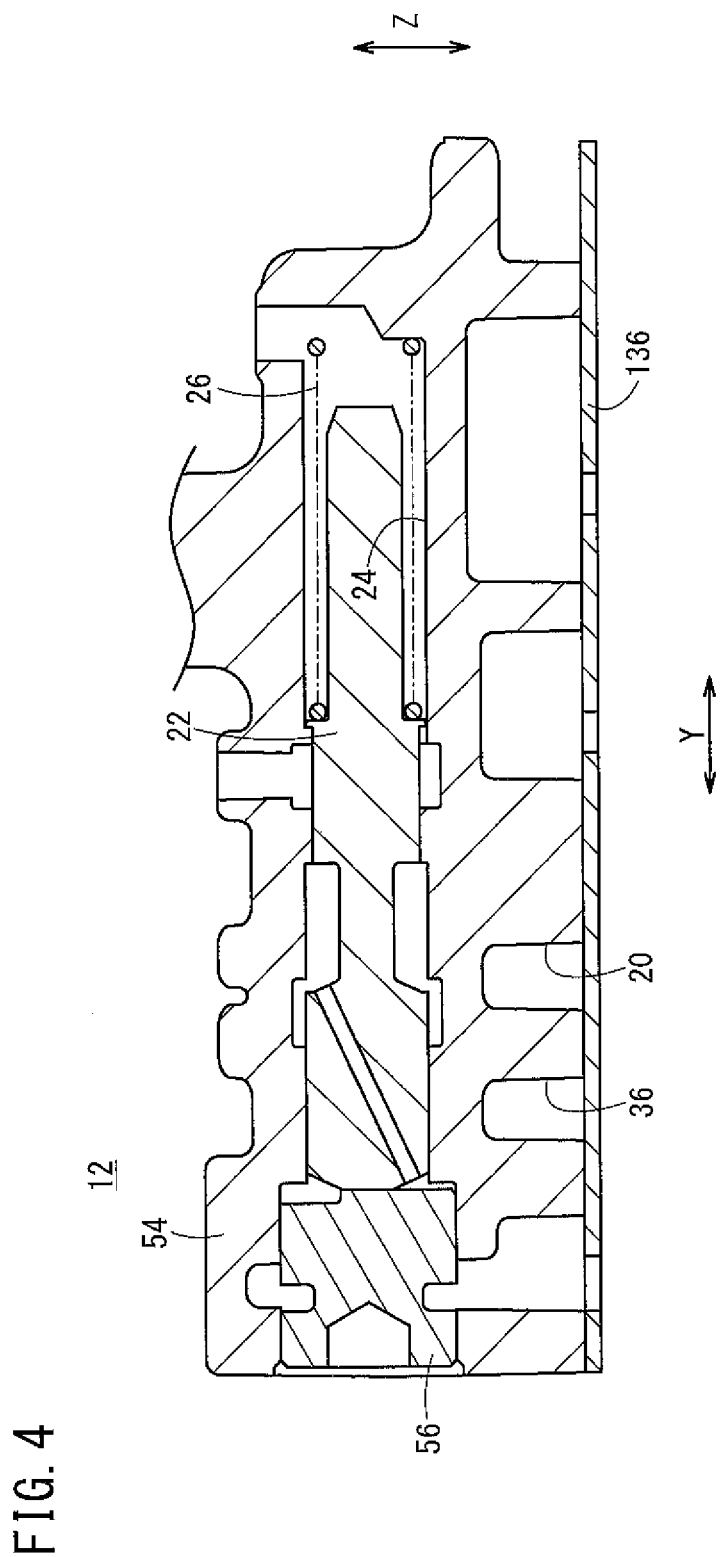
FIG. 4 is a cross-sectional view taken along line IV-IV of FIG. 3.

The ends of the first valve hole 24, the second valve hole 34, and the third valve hole 40 are closed by caps 56, 58, 60, respectively. As shown in FIG. 4, which is a cross-sectional view taken along line IV-IV of FIG. 3, and FIG. 5, which is a cross-sectional view taken along line V-V of FIG. 3, other ends of the first valve hole 24 and the third valve hole 40 are closed by the body 54 itself. An end of the solenoid 30 is exposed in the other end of the second valve hole 34 (see FIGS. 2 and 3).

Figure 5:
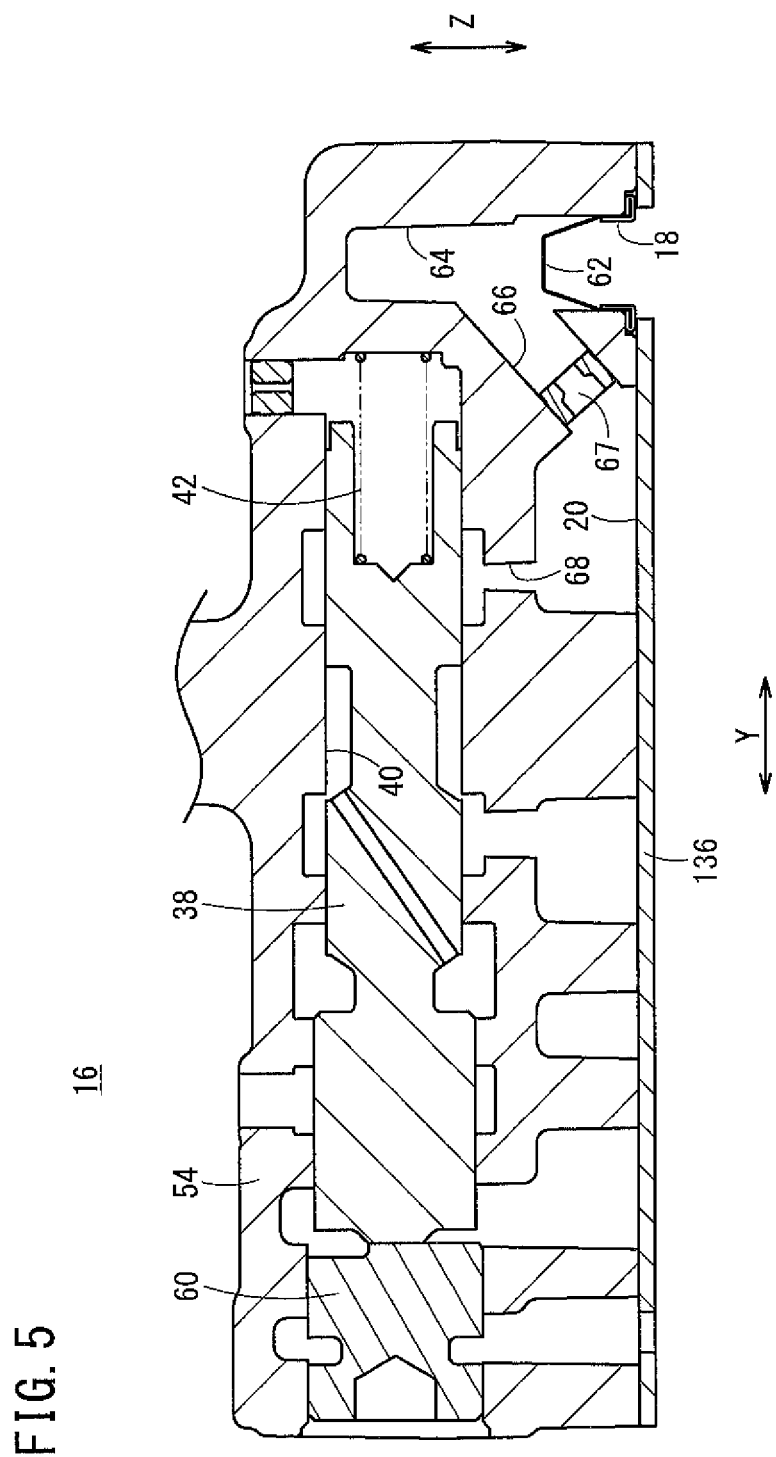
FIG. 5 is a cross-sectional view taken along line V-V of FIG. 3.
Figure 6:
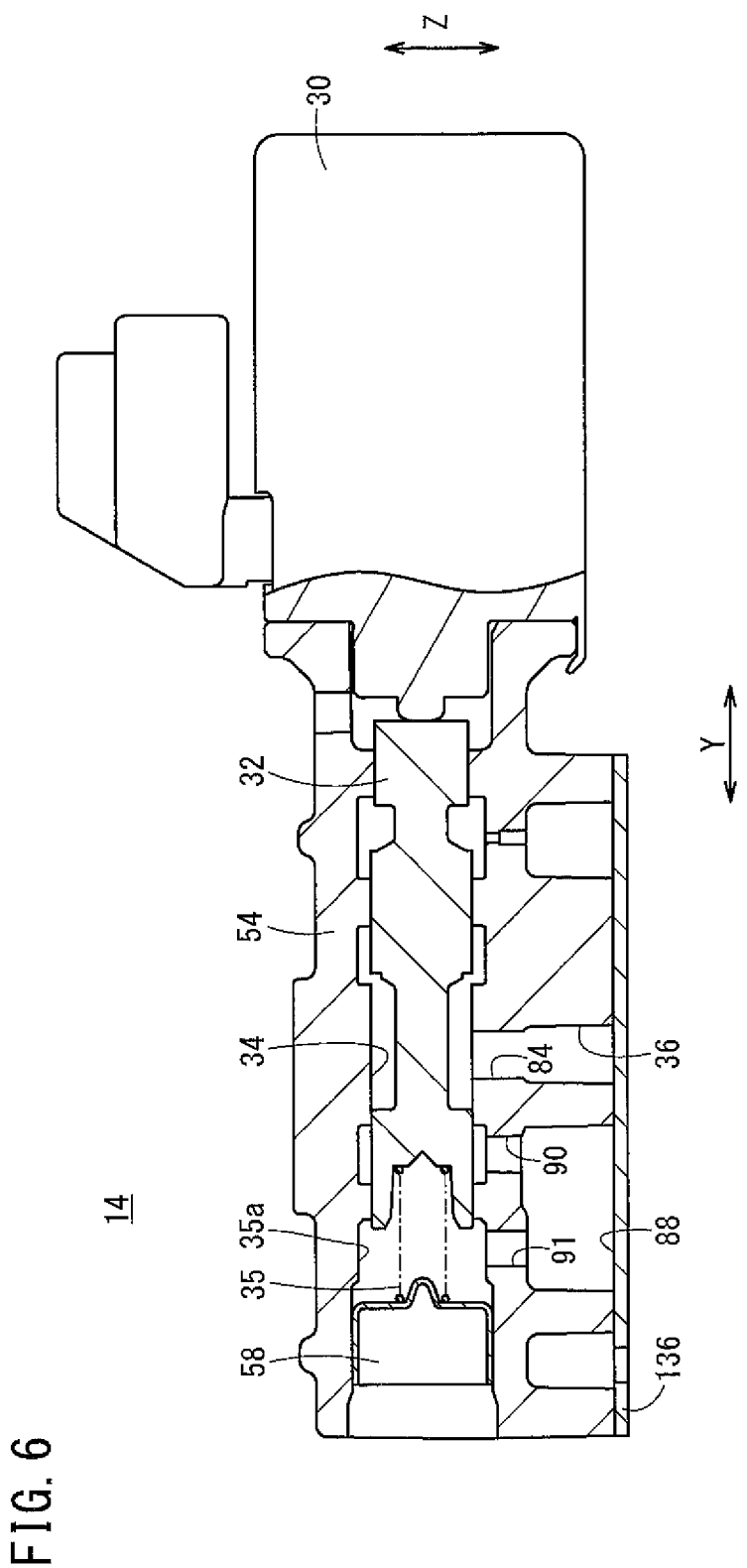
FIG. 6 is a cross-sectional view taken along line VI-VI of FIG. 3.

As shown in FIGS. 4 and 5, the first pressure regulating spring 26 is arranged between the first valve rod 22 and an inner wall surface of the body 54, and the third pressure regulating spring 42 is arranged between the third valve rod 38 and an inner wall surface of the body 54. The first pressure regulating spring 26 and the third pressure regulating spring 42 resiliently bias the first valve rod 22 and the third valve rod 38 so as to move in directions toward the respective caps 56, 60. As shown in FIG. 6, which is a cross-sectional view taken along line VI-VI of FIG. 3, the second pressure regulating spring 35 is arranged between the cap 58 and the second valve rod 32, so as to resiliently bias the second valve rod 32 to move in a direction toward the solenoid 30.

As shown in FIG. 3, the inlet port 18, the first oil passageway 20, the second oil passageway 28, the third oil passageway 36, and the outlet port 44 are defined in the open end face of the body 54. The ports and the oil passageways are defined by a wall, which will be referred to as an "oil passageway wall" and is denoted by the reference numeral 61.

The inlet port 18 is defined near the first oil passageway 20 and the third valve hole 40. A filter 62 is arranged in the inlet port 18 for removing foreign matter from the working oil (see FIG. 5).

The inlet port 18 is joined to an inlet passageway 64, which is defined in the body 54 downstream of the inlet port 18, and as shown in FIG. 5, extends in a straight line along the thicknesswise direction (Z direction) of the body 54. The depth of the inlet passageway 64 from the top surface of the oil passageway wall 61 is greater than the depth of the first oil passageway 20.

The inlet passageway 64 and the first oil passageway 20 are held in fluid communication with each other through a communication passageway 66. An upstream end of the communication passageway 66 opens into the inlet passageway 64 at a substantially central position thereof in the heightwise direction (Z direction) of the inlet passageway 64. The communication passageway 66 extends obliquely to the thicknesswise direction of the body 54, and a downstream end of the communication passageway 66 opens into an upstream end of the first oil passageway 20. An orifice 67 of the communication passageway 66 is located near one end thereof that opens into the first oil passageway 20.

As shown in FIG. 3, the first oil passageway 20 extends tortuously along the axis (Y direction) of the third valve hole 40, and bends toward the first valve hole 24 in the vicinity of a downstream end of the third valve hole 40. The first oil passageway 20 has a downstream end positioned over and across the first valve hole 24.

A first line pressure inlet port 68 (third valve hole line pressure inlet) is defined in the body 54 near the upstream end of the first oil passageway 20 and in the vicinity of the downstream opening of the communication passageway 66. A second line pressure inlet port 70 (first valve hole line pressure inlet) is defined in the body 54 near the downstream end of the first oil passageway 20. Therefore, the first line pressure inlet port 68 and the second line pressure inlet port 70 are defined successively downstream in this order along the first oil passageway 20. The first oil passageway 20 is held in fluid communication with the third valve hole 40 (see FIG. 5) through the first line pressure inlet port 68, and with the first valve hole 24 through the second line pressure inlet port 70. Therefore, the working oil, which is introduced from the inlet port 18 into the first oil passageway 20, is distributed to the first valve hole 24 and the third valve hole 40.

The second oil passageway 28 is defined over and across a portion of the first valve hole 24 as well as a portion of the second valve hole 34 (see FIG. 3). The second oil passageway 28 extends substantially in a straight line along the widthwise direction (X direction) of the body 54, and is shorter than the first oil passageway 20 and the third oil passageway 36.

A first valve hole outlet hole 72 (first valve hole outlet) for releasing the working oil out of the first valve hole 24 is defined in the body 54 near the upstream end of the second oil passageway 28, and a second valve hole inlet hole 74 (second valve hole inlet) for introducing the working oil into the second valve hole 34 is defined in the body 54 near the downstream end of the second oil passageway 28. Therefore, the second oil passageway 28 is held in fluid communication with the first valve hole 24 through the first valve hole outlet hole 72, and is held in fluid communication with the second valve hole 34 through the second valve hole inlet hole 74.

A first pool 76 is defined in the body 54 near the first oil passageway 20. The third valve hole 40 and the first pool 76 are held in fluid communication with each other through a first communication hole 78.

Figure 7:
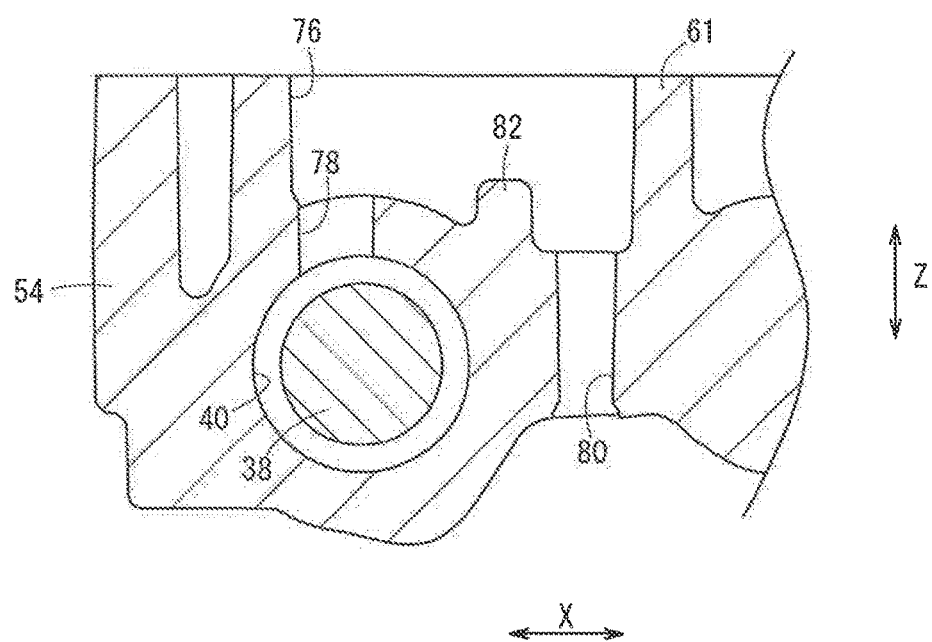
FIG. 7 is a cross-sectional view taken along line VII-VII of FIG. 3.

As shown in FIG. 7, which is a cross-sectional view taken along line VII-VII of FIG. 3, the body 54 has a first drain hole 80 that is defined through the body 54. The first pool 76 and the first drain hole 80 are divided from each other by an overflow wall 82, the dimension of which along the heightwise direction (Z direction) is smaller than the oil passageway wall 61. If the amount of working oil that flows into the first pool 76 is too large to be blocked by the overflow wall 82, the working oil in the first pool 76 overflows the overflow wall 82 and is drained from the first drain hole 80.

The third oil passageway 36 extends along the axial direction (Y direction) of the second valve hole 34, bends toward the first valve hole 24 and the third valve hole 40, and extends over the first valve hole 24 to the third valve hole 40. Accordingly, most of the third oil passageway 36 extends along the widthwise direction (X direction) of the body 54.

A second valve hole outlet hole 84 (second valve hole outlet) for releasing the working oil out of the second valve hole 34 is defined in the body 54 at a position at which the third oil passageway 36 bends from the second valve hole 34 toward the first valve hole 24. A solenoid pressure inlet hole 86 (solenoid pressure inlet) for introducing the working oil into the third valve hole 40 is defined in the body 54 at the downstream end of the third oil passageway 36. The third oil passageway 36 is held in fluid communication with the second valve hole 34 through the second valve hole outlet hole 84, and is held in fluid communication with the third valve hole 40 through the solenoid pressure inlet hole 86 (see FIG. 5).

A second pool 88 is defined in the body 54 near the third oil passageway 36 (see FIG. 3). The second valve hole 34 and the second pool 88 are held in fluid communication with each other through a second communication hole 90. A damper orifice 91 is defined through the body 54 in the vicinity of the second communication hole 90.

Figure 8:
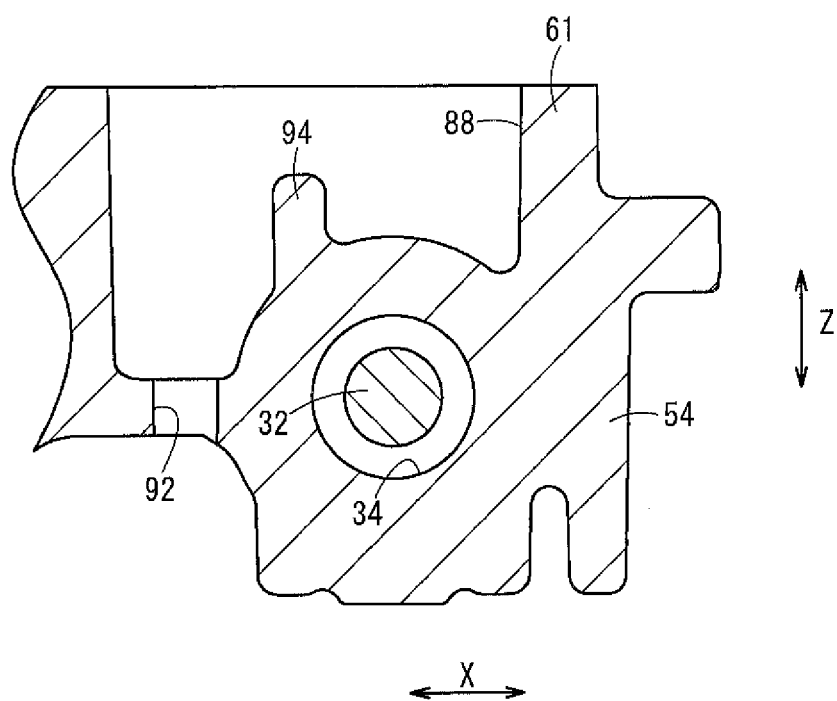
FIG. 8 is a cross-sectional view taken along line VIII-VIII of FIG. 3.

A second drain hole 92 is defined through the body 54. As shown in FIG. 8, which is a cross-sectional view taken along line VIII-VIII of FIG. 3, the second pool 88 and the second drain hole 92 are divided from each other by an overflow wall 94, the dimension of which along the heightwise direction (Z direction) is smaller than the oil passageway wall 61. As with the first pool 76, if the amount of working oil that flows into the second pool 88 is too large to be blocked by the overflow wall 94, the working oil in the second pool 88 overflows the overflow wall 94 and is drained from the second drain hole 92.

Figure 9:
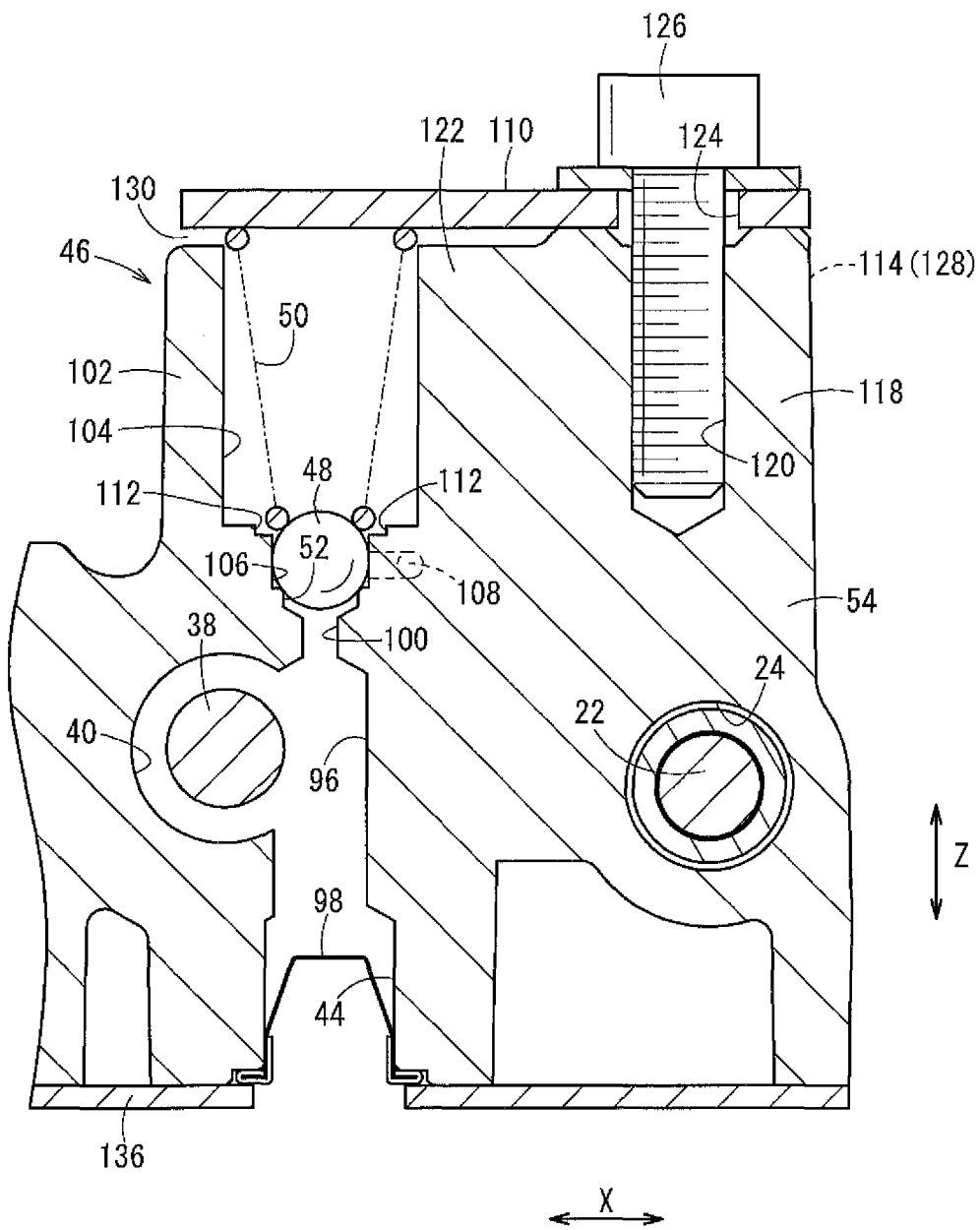
FIG. 9 is a fragmentary vertical cross-sectional view of the hydraulic pressure control apparatus in the vicinity of a relief valve.

The outlet port 44 opens in the vicinity of the first oil passageway 20 (see FIG. 3). An outlet passageway 96 is joined upstream to the outlet port 44. In other words, the outlet port 44 serves as a downstream opening of the outlet passageway 96. As shown in FIG. 9, which is a fragmentary vertical cross-sectional view of the hydraulic pressure control apparatus 10 near the relief valve 46, i.e., a cross-sectional view taken along line IX-IX of FIG. 10, the outlet passageway 96 extends in a straight line along the thicknesswise direction of the body 54, and lies perpendicularly across the third valve hole 40 at a substantially central position in the axial direction of the third valve hole 40.

The central axis of the outlet passageway 96 is offset from the central axis of the third valve hole 40. An upstream end of the outlet passageway 96 opens laterally to the third valve hole 40.

A filter 98 is arranged in the outlet port 44. If an abrasive powder, for example, is generated and becomes mixed in the working oil in the body 54, the filter 98 removes the abrasive powder from the working oil when the working oil flows out of the outlet port 44. Therefore, the working oil, which is made clean by the filter 98, is discharged from the outlet port 44.

The relief valve 46 has an introduction port 100 arranged above and joined to the outlet passageway 96. In other words, the outlet passageway 96 branches into the outlet port 44 and the introduction port 100. The introduction port 100 is placed in a closed condition when the spherical valve element 48 of the relief valve 46 is seated on the valve seat 52. The introduction port 100 comprises a constricted passageway, the inside diameter of which is smaller than the outlet passageway 96.

Figure 10:
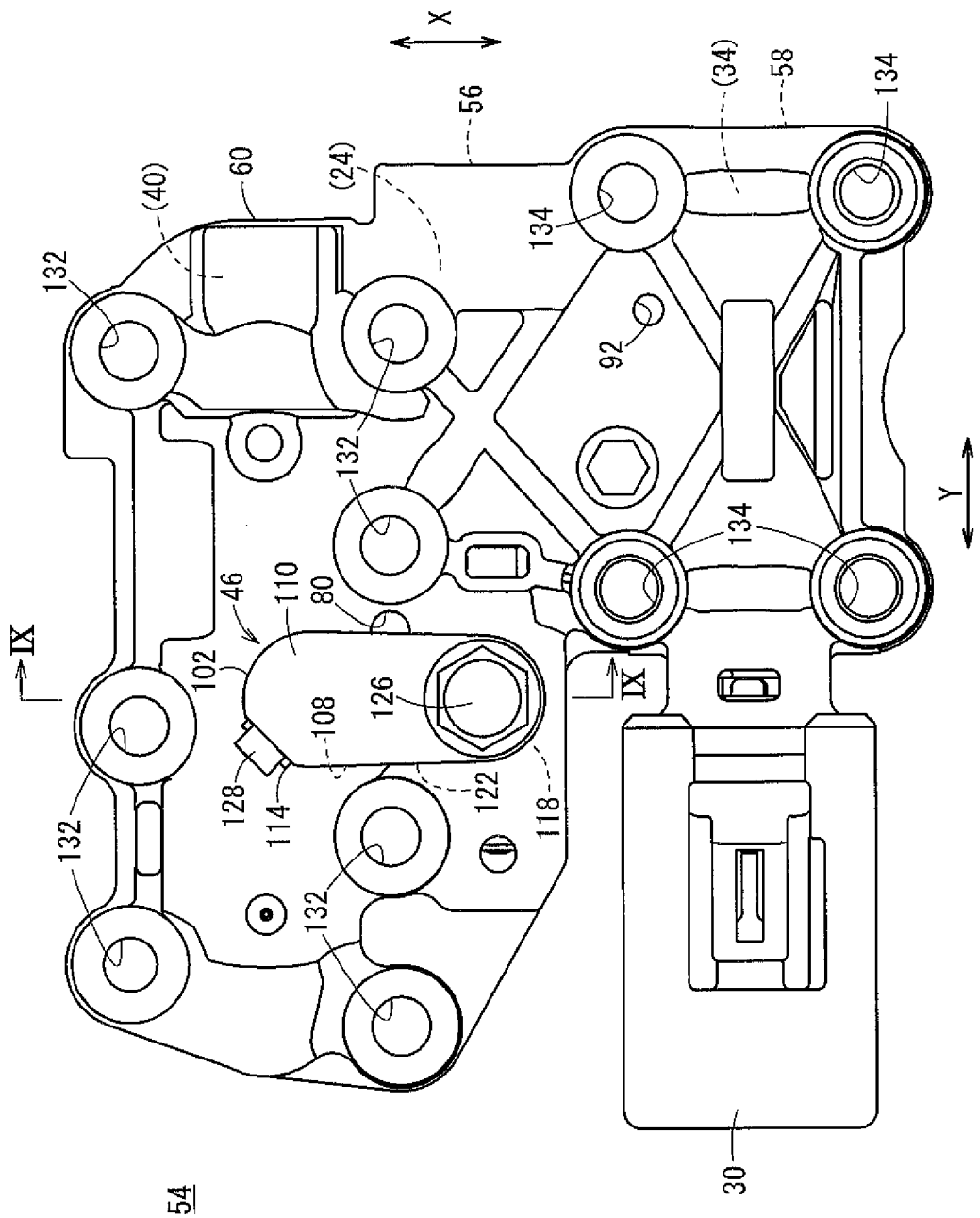
FIG. 10 is a plan view of a closed end face of the body.

More specifically, as shown in FIGS. 9 and 10, a tubular boss 102, which serves as a body of the relief valve 46, protrudes integrally from the closed end face of the body 54 at a position above the third valve hole 40. Therefore, the regulator valve 12, the solenoid-operated valve 14, the control valve 16, and the relief valve 46 occupy the single body 54 in a shared manner. In addition, the spherical valve element 48 and the closing spring 50 are housed in a relief chamber 104, which is defined in the tubular boss 102.

Between the introduction port 100 and the relief chamber 104, the body 54 includes an annular inner wall surface, which protrudes radially inward to form the valve seat 52, and a guide 106 having an inner circumferential wall surface for guiding the spherical valve element 48. A relief hole 108 is defined through the body 54 immediately above the valve seat 52. The relief hole 108 extends in a straight line horizontally from the inner circumferential wall surface of the guide 106 to an outer wall surface of the tubular boss 102. Thus, the relief hole 108 is defined as a horizontal hole, and comprises a constricted passageway similar to the introduction port 100.

The spherical valve element 48 has a surface that is exposed outside of the guide 106. An end of the closing spring 50 is seated on the exposed surface of the spherical valve element 48. The other end of the closing spring 50 is held against (in contact with) an inner surface of a cover 110, which covers the upper surface of the tubular boss 102.

Figure 11:
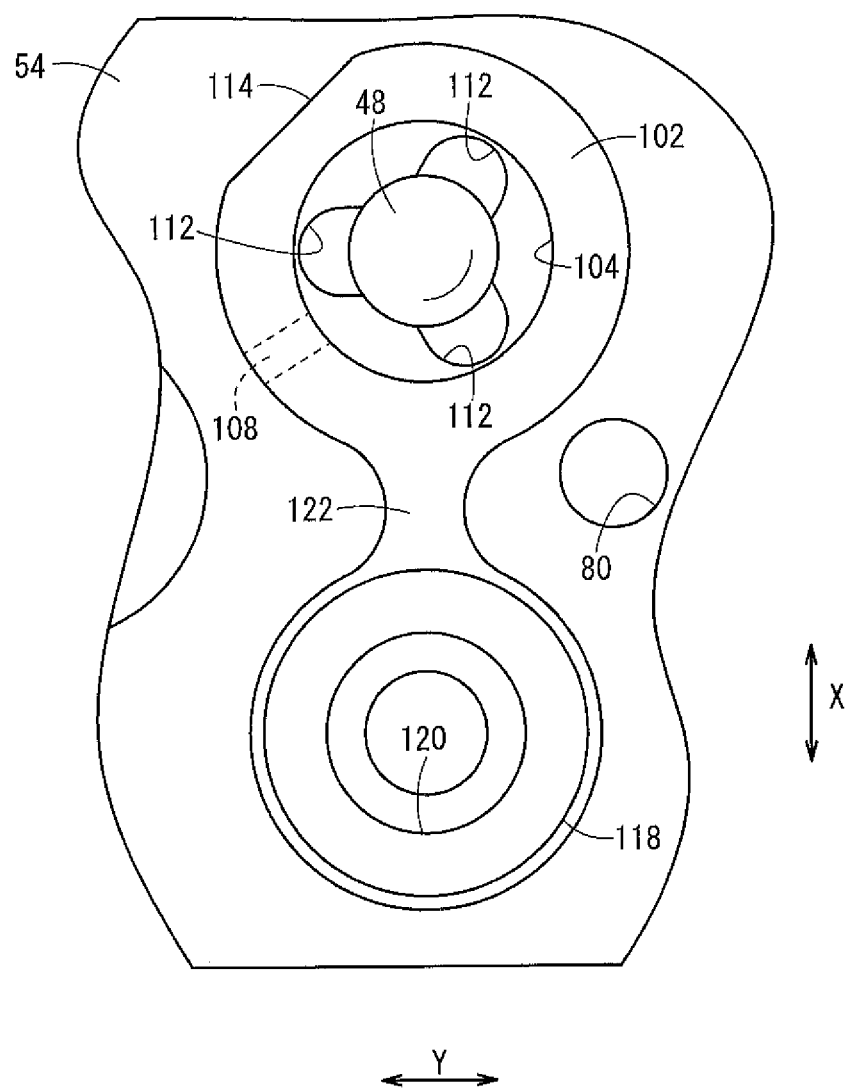
FIG. 11 is an enlarged fragmentary plan view of the closed end face of the body.

As shown in FIG. 9 and FIG. 11, in which the cover 110 and the closing spring 50 are omitted from illustration, three angularly spaced recesses 112 are defined in a bottom wall of the relief chamber 104. Each of the recesses 112 is substantially semicircular in shape. The guide 106 includes regions in which the recesses 112 are defined, and such regions have a dimension in the heightwise direction (Z direction), which is smaller than other regions of the guide 106. Stated otherwise, the guide 106 has vertical grooves defined therein that serve as the recesses 112 (see FIG. 9).

The tubular boss 102 has an outer side wall surface including a vertical wall surface (engaging portion) 114 (see FIG. 11), which is shaped in such a manner that a portion of the outer side wall is cut off from the upper end toward the body 54.

A joining tubular boss 118 protrudes integrally from the body 54 adjacent to the tubular boss 102, at a position above the third valve hole 40 (i.e., the control valve 16) on the closed end face of the body 54. The joining tubular boss 118 has an internally threaded surface 120 (see FIGS. 9 and 11) and is joined to the tubular boss 102 by a rib 122, which is thinner than the tubular boss 102 and the joining tubular boss 118 (see FIG. 11). The rib 122 also protrudes integrally from the body 54.

The cover 110 is essentially in the form of a rectangular plate (see FIGS. 2 and 9), and is attached to the joining tubular boss 118 in covering relation to upper surfaces of the tubular boss 102 and the joining tubular boss 118. The cover 110 has a through hole 124 (see FIG. 9) defined therein. A fastening bolt 126 that serves as a fastener is inserted through the through hole 124 and is threaded into the internally threaded surface 120 of the joining tubular boss 118, thereby securing the cover 110 in position.

The cover 110 includes a hook 128 (see FIGS. 2 and 9) that is formed in a protruding manner and hangs from one end thereof. The hook 128 is engaged by the vertical wall surface 114 of the tubular boss 102, thereby preventing the cover 110 from turning. Therefore, the vertical wall surface 114 functions as a lock for locking the hook 128 of the cover 110 in position.

The height of the tubular boss 102 is smaller than that of the joining tubular boss 118. Consequently, when the cover 110 is fastened to the upper end of the joining tubular boss 118, a small clearance 130 (see FIG. 9) remains between the cover 110 and the upper surface of the tubular boss 102. The relief chamber 104 is vented to atmosphere through the clearance 130. In this manner, working oil, which has leaked into the relief chamber 104, is discharged from the clearance 130.

As shown in FIGS. 2, 3, and 10, the body 54 includes a plurality of first insertion holes 132 (fastener insertion holes) and second insertion holes 134 (fastener insertion holes) defined in a thicknesswise direction thereof. Joining bolts that serve as fasteners pass through the first insertion holes 132 and the second insertion holes 134. More specifically, seven first insertion holes 132 are positioned near the first valve hole 24 and the third valve hole 40, and four second insertion holes 134 are positioned near the second valve hole 34.

As shown in FIGS. 2 and 3, the distance (pitch) P1 between the first insertion holes 132 along the axial direction (Y direction) is less than the distance (pitch) P2 between the second insertion holes 134 along the axial direction (Y direction). Stated otherwise, the plural first insertion holes 132 are spaced relatively densely, whereas the plural second insertion holes 134 are spaced relatively coarsely.

The hydraulic pressure control apparatus 10 according to the present embodiment basically is constructed as described above. Operations and advantages of the hydraulic pressure control apparatus 10 will be described below.

The body 54 of the hydraulic pressure control apparatus 10 may be produced by die casting, for example. The tubular boss 102, the rib 122, and the joining tubular boss 118 may be formed so as to extend along a direction (Z direction) in which the casting die assembly is opened. Therefore, the body 54 can be produced with ease.

The relief valve 46 is assembled in the body 54 in the following manner. The spherical valve element 48 and the closing spring 50 are inserted in this order into the tubular boss 102, i.e., the relief chamber 104, and thereafter, the cover 110 is attached so as to cover the tubular boss 102 and the upper surface of the joining tubular boss 118. At this time, the through hole 124 is aligned with the internally threaded surface 120, and the hook 128 is placed in engagement with the vertical wall surface 114.

Then, the fastening bolt 126 is inserted into the through hole 124 and threaded into the internally threaded surface 120, thereby fastening the cover 110 in position. At this time, since the hook 128 is placed in engagement with the vertical wall surface 114, the cover 110 is prevented from turning around the fastening bolt 126. Since the cover 110 is prevented from turning by the vertical wall surface 114 that engages the hook 128, the cover 110 can easily be installed on the body 54, or in other words, assembly of the relief valve 46 can be facilitated.

As described above, the relief valve 46 can easily be assembled simply by inserting the spherical valve element 48 and the closing spring 50 into the tubular boss 102, followed by fastening the cover 110 to the joining tubular boss 118 with the fastening bolt 126.

The hydraulic pressure control apparatus 10 is mounted on a non-illustrated companion member with a separate plate 136 interposed therebetween. The hydraulic pressure control apparatus 10 is connected to the companion member by joining bolts, not shown, which are inserted through the first insertion holes 132 and the second insertion holes 134, such that the open end face having the first oil passageway 20, the second oil passageway 28, and the third oil passageway 36 defined therein (see FIG. 3) is closed. More specifically, the side of the oil passageway wall 61 is arranged in facing relation to the companion member. Generally, the open end face shown in FIG. 3 is directed upwardly, whereas the closed end face shown in FIG. 10 is directed downwardly. A controller such as an ECU or the like is connected electrically to the solenoid 30.

The hydraulic pressure control apparatus 10 operates in the following manner.

At first, the hydraulic pressure control apparatus 10 is supplied with working oil under a predetermined initial oil pressure (line pressure) by a non-illustrated oil pump. The working oil passes through the filter 62 (see FIG. 5), which removes foreign matter, and thereafter, the working oil is introduced from the inlet port 18 into the body 54, and flows along the inlet passageway 64 in the thicknesswise direction of the body 54.

Since the communication passageway 66 is defined at an intermediate position along the heightwise direction of the inlet passageway 64, the working oil flows through the communication passageway 66, and then flows through the orifice 67. The working oil is limited in flow rate and increased in speed by the orifice 67, and then, the working oil flows into the first oil passageway 20.

If the communication passageway 66 were defined as a horizontal hole extending along the axial direction Y, then the distance along the communication passageway 66 between the inlet passageway 64 and the first oil passageway 20 would be large, and the length of the body 54 would necessarily increase along the thicknesswise direction (Z direction) thereof. In contrast, according to the present embodiment, the communication passageway 66, which is defined downstream of the filter 62, is inclined with respect to the thicknesswise direction (Z direction) of the body 54, and the downstream end thereof opens upwardly at the starting end of the first oil passageway 20. Consequently, since the length of the body 54 in the thicknesswise direction (Z direction) is smaller than if the communication passageway 66 were defined as a horizontal hole, the body 54 is reduced in size.

Further, since the orifice 67 is arranged downstream of the filter 62, the flow speed of the working oil increases after the working oil has passed through the filter 62. After the working oil passes through the orifice 67 and is increased in speed, the working oil does not contact the filter 62, because the orifice 67 is not arranged upstream of the filter 62. Consequently, an excessive burden is not imposed on the filter 62.

The working oil, which has entered the first oil passageway 20, flows along the first oil passageway 20. Since the first line pressure inlet port 68 and the second line pressure inlet port 70 are arranged successively downstream in this order along the first oil passageway 20, the working oil enters the third valve hole 40 and the first valve hole 24.

The working oil, which has entered into the first valve hole 24, will be described below. In the first valve hole 24, as shown in FIGS. 1 and 4, the first valve rod 22 of the regulator valve 12 is resiliently biased by the first pressure regulating spring 26. When the first valve rod 22 stops at a position at which the resilient biasing force of the first pressure regulating spring 26 and the feedback oil pressure that acts on the first valve rod 22 are held in equilibrium, the oil pressure of the working oil is reduced, i.e., the working oil is depressurized.

The working oil, which has entered into the third valve hole 40, is supplied under the line pressure to the control valve 16, as will be described later.

The working oil, which has been depressurized in the first valve hole 24 by the regulator valve 12, is released through the first valve hole outlet hole 72 into the second oil passageway 28. The working oil flows along the second oil passageway 28, and then flows from the second valve hole inlet hole 74 into the second valve hole 34 (see FIG. 3).

According to the present embodiment, since the regulator valve 12 and the solenoid-operated valve 14 are arranged adjacent to each other, the second oil passageway 28, which keeps the first valve hole outlet hole 72 (the outlet port of the regulator valve 12) and the second valve hole inlet hole 74 (the inlet port of the solenoid-operated valve 14) in fluid communication with each other, can be of a short straight shape. Therefore, the working oil, which is released out of the first valve hole 24, can quickly reach the second valve hole 34, thereby increasing the response speed.

The working oil, which has entered into the second valve hole 34 through the regulator valve 12, i.e., the depressurized working oil, applies an input oil pressure to the solenoid-operated valve 14. A controller such as an ECU or the like supplies a command electric current to the solenoid 30 of the solenoid-operated valve 14. In response to the command electric current, the solenoid 30 applies a thrust force, which corresponds to the value of the command electric current, to the second valve rod 32.

As a result, the feedback oil pressure, the thrust force from the solenoid 30, and the resilient biasing force from the second pressure regulating spring 35 all act on the second valve rod 32. The second valve rod 32 is held in a position at which such forces are kept in equilibrium, further regulating the oil pressure of the working oil, or generally depressurizing the working oil, in order to attain a predetermined solenoid pressure.

During this time, a portion of the working oil is released from the second valve hole 34 and through the second communication hole 90, and is stored in the spring chamber 35a and the second pool 88 (see FIG. 8). The working oil, which is stored in the spring chamber 35a and the second pool 88, functions as a damper on the second valve rod 32. More specifically, since the working oil is stored in the second pool 88 which is formed on the upper side of the spring chamber 35a with respect to the direction of gravity, the working oil flows from the spring chamber 35a into the second pool 88, or vice versa through the damper orifice 91 upon movement of the second valve rod 32. Therefore, the oil pressure that acts on the second valve rod 32 is prevented from oscillating.

When working oil in excess of a certain amount flows into the second pool 88, the excessive working oil overflows the overflow wall 94 and is drained from the second drain hole 92.

The working oil, the oil pressure of which has been regulated to attain the solenoid pressure, is released from the second valve hole outlet hole 84 into the third oil passageway 36 (see FIGS. 1 and 3). Furthermore, the working oil flows along the third oil passageway 36 and enters the third valve hole 40 through the solenoid pressure inlet hole 86. Thus, the control valve 16 is supplied with working oil under the line pressure introduced from the inlet port 18, and further is supplied with working oil released from the solenoid-operated valve 14 under the solenoid pressure.

Consequently, the resilient biasing force from the third pressure regulating spring 42, the solenoid pressure (pilot pressure), and the feedback oil pressure that acts on the control valve 16 are applied to the third valve rod 38 of the control valve 16. The third valve rod 38 is held in a position at which such forces are kept in equilibrium, thereby regulating the oil pressure of the working oil, or depressurizing the working oil, which is supplied under the line pressure to the control valve 16. At this time, the working oil is regulated to attain a predetermined oil pressure, e.g., a predetermined clutch pressure (actuating pressure).

The outlet passageway 96 lies perpendicularly across the third valve hole 40. Therefore, the working oil under the clutch pressure flows through the outlet passageway 96 that extends along the thicknesswise direction of the body 54, and is released from the outlet port 44. The working oil released from the outlet port 44 is supplied to a non-illustrated clutch. If an abrasion powder is generated in the first valve hole 24, the second valve hole 34, or the third valve hole 40 and is carried by the working oil, the abrasion powder becomes trapped by the filter 98 arranged in the outlet port 44. Therefore, the clutch can be supplied with clean working oil.

As described above, the working oil under the clutch pressure flows only along the thicknesswise direction of the body 54, and not through any of the oil passageways defined in the open end face. In other words, there is no need to provide oil passageways in the open end face for passage of the working oil under the clutch pressure.

According to the present embodiment, the solenoid-operated valve 14 and the control valve 16 are juxtaposed with the regulator valve 12 interposed therebetween. Since the regulator valve 12 and the control valve 16 lie parallel to each other, the length of the first oil passageway 20 that interconnects the regulator valve 12 and the control valve 16 can be reduced.

Since the first oil passageway 20 and the second oil passageway 28 are shortened for the reasons described above, the total length of the oil passageways is reduced. Consequently, the body 54 and hence the hydraulic pressure control apparatus 10 as a whole can be reduced in size.

Furthermore, since the regulator valve 12, the solenoid-operated valve 14, and the control valve 16 are juxtaposed with their axes arrayed along the widthwise direction (X direction) of the body 54, the hydraulic pressure control apparatus 10 is not increased in size along the thicknesswise direction (Z direction) of the body 54. Along therewith, the hydraulic pressure control apparatus 10 can also be made smaller in size.

Inasmuch as the first oil passageway 20 and the second oil passageway 28 are shortened in length, the working oil reaches the first valve hole 24, the second valve hole 34, and the third valve hole 40 quickly. Therefore, the regulator valve 12, the solenoid-operated valve 14, and the control valve 16 produce an improvement in response speed.

A portion of the working oil, which has entered into the third valve hole 40, is released from the third valve hole 40 and through the first communication hole 78, and is stored in the first pool 76. When working oil in excess of a certain amount flows into the first pool 76, the excessive working oil overflows the overflow wall 82 and is drained from the first drain hole 80.

As can be understood from the above description, the hydraulic pressure control apparatus 10 allows the regulator valve 12 and the control valve 16 to be supplied with working oil under high pressure. According to the present embodiment, the pitch P1 between the first insertion holes 132 near the first valve hole 24 and the third valve hole 40 under high pressure is reduced, whereas the pitch P2 between the second insertion holes 134 near the second valve hole 34 under relatively low pressure is increased (see FIGS. 3 and 10). Therefore, it is necessarily the case that the distance between the joining bolts near the regulator valve 12 and the control valve 16 is smaller than the distance between the joining bolts near the solenoid-operated valve 14.

When the hydraulic pressure control apparatus 10 is installed on the companion member by the joining bolts, a greater surface pressure can be applied to the oil passageway wall 61 near the regulator valve 12 and the control valve 16. In other words, the oil passageway wall 61 near the regulator valve 12 and the control valve 16 is firmly held in contact with the companion member. Consequently, working oil is prevented from leaking from between the companion member and the area near the third valve hole 40 in the body 54.

The distance between the joining bolts near the solenoid-operated valve 14 is greater than the distance between the joining bolts near the regulator valve 12 and the control valve 16. Further, the solenoid-operated valve 14 is supplied with working oil and discharges the working oil under a relatively low pressure. Therefore, although a large pressure is not applied between the oil passageway wall 61 near the solenoid-operated valve 14 and the companion member, the working oil is prevented sufficiently from leaking from between the companion member and the area near the second valve hole 34 in the body 54.

The tubular boss 102, and the rib 122 and the joining tubular boss 118 are arranged in respective areas above the first valve hole 24 and the third valve hole 40. The tubular boss 102, and the rib 122 and the joining tubular boss 118 serve to increase the mechanical strength of areas in the vicinity of the first valve hole 24 and the third valve hole 40. In other words, such areas of the body 54, which are held under relatively high pressure, have sufficient mechanical strength.

As described above, while the working oil is flowing, since the outlet passageway 96 also is held in fluid communication with the introduction port 100 of the relief valve 46 (see FIG. 9), the working oil, which is released from the third valve hole 40 into the outlet passageway 96, also flows into the introduction port 100. Since the introduction port 100 is connected to the outlet passageway 96 and extends along the thicknesswise direction of the body 54, the working oil that is directed toward the relief valve 46 flows only in the thicknesswise direction of the body 54. In other words, there is no need to provide oil passageways in the open end face of the body 54 for guiding the working oil toward the relief valve 46. This also contributes to reducing the total length of all of the oil passageways, and hence leads to a reduction in the size of the hydraulic pressure control apparatus 10, as well as increasing the response speed of the relief valve 46.

As described above, the pressing force from the working oil and the resilient biasing force from the closing spring 50 both act on the spherical valve element 48 of the relief valve 46. If the resilient biasing force from the closing spring 50 is greater than the pressing force (i.e., the clutch pressure) from the working oil, the spherical valve element 48 remains seated on the valve seat 52. The spherical valve element 48 is resiliently biased toward the valve seat 52 by the closing spring 50. At this time, the relief valve 46 is closed.

Normally, the clutch pressure is set to a level which is less than the resilient biasing force from the closing spring 50. Since the relief valve 46 remains in a closed condition, the working oil in the body 54 flows only along a route from the inlet port 18 to the outlet port 44.

For inspecting the relief valve 46 in order to check whether or not the relief valve 46 is operating normally, the first drain hole 80 initially is closed by a non-illustrated rod-shaped inspection tool, for example. Then, the clutch pressure from the outlet port 44 is increased until the clutch pressure exceeds the resilient biasing force from the closing spring 50, i.e., up to a predetermined threshold pressure. If the relief valve 46 is opened under the threshold pressure, the relief valve 46 is judged as operating normally. On the other hand, if the relief valve 46 remains closed under the threshold pressure, the relief valve 46 is judged as malfunctioning.

When the relief valve 46 operates normally, the relief valve 46 is opened in the following manner.

If the working oil that flows into the introduction port 100 is applied under a pressure that is equal to or greater than the threshold pressure, e.g., is applied at the threshold pressure, the spherical valve element 48 is displaced by the working oil and becomes unseated from the valve seat 52. Thus, the introduction port 100 is opened, thereby opening the relief valve 46. Upon displacement of the spherical valve element 48, the spherical valve element 48 is guided by the guide 106, and the closing spring 50 is compressed.

The working oil flows through the relief hole 108, which is defined as a horizontal hole, and is borne by a semispherical portion of the spherical valve element 48, which faces toward the introduction port 100. Since the relief hole 108 is defined between the valve seat 52 and the guide 106, or immediately above the valve seat 52, the working oil essentially is not directed upwardly into the relief chamber 104, but rather is quickly discharged out of the body 54 through the relief hole 108.

When the working oil is borne by the semispherical portion of the spherical valve element 48, the spherical valve element 48 is displaced or lifted a predetermined distance to a certain position and is held in the displaced position. The displaced position is a location at which the force that the spherical valve element 48 bears from the working oil in the guide 106, and the resilient biasing force from the closing spring 50 are kept in equilibrium. Therefore, the displaced position where the spherical valve element 48 is held can be adjusted by adjusting the force that is borne by the spherical valve element 48 from the working oil in the guide 106, and the resilient biasing force from the closing spring 50. Preferably, the displaced position where the spherical valve element 48 is held is in the vicinity of the valve seat 52.

The force that is borne by the spherical valve element 48 due to the working oil in the guide 106 can be adjusted by adjusting the diameters of the respective constricted passageways provided in the introduction port 100 and the relief hole 108. For example, the diameter of the constricted passageway provided in the introduction port 100 should be smaller than the diameter of the constricted passageway provided in the relief hole 108.

As described above, since the entire surface of the semispherical portion of the spherical valve element 48 bears the working oil, and the relief hole 108 is defined immediately above the valve seat 52, the spherical valve element 48 is displaced or lifted by a small distance. The closing spring 50 may be of a small size, because the closing spring 50 only needs to be compressed sufficiently to allow the spherical valve element 48 to be displaced by the aforementioned small distance. Consequently, the height of the tubular boss 102, in which the relief chamber 104 housing the closing spring 50 is defined, i.e., the dimension of the tubular boss 102 along the Z direction, is small. Since the height of the rib 122 and the height of the joining tubular boss 118 necessarily are small, the relief valve 46 and the area surrounding the relief valve 46, and hence the hydraulic pressure control apparatus 10 as a whole, can be reduced in size.

The three recesses 112, which are defined in the bottom wall of the relief chamber 104, serve as vertical grooves in the guide 106. When the working oil is applied at a higher pressure, tending to lift the spherical valve element 48 beyond the predetermined distance, the working oil leaks from the recesses 112, thereby preventing the spherical valve element 48 from being further lifted.

Since the spherical valve element 48 is prevented from being further lifted, the distance by which the closing spring 50 is deformed or compressed is reduced. As a result, the closing spring 50 and hence the hydraulic pressure control apparatus 10 can be reduced in size. The recesses 112 are defined at a position slightly above the displaced position at which the spherical valve element 48 is held. Accordingly, the recesses 112 are defined at a position from which the working oil can be leaked.

As the working oil flows through the hydraulic pressure control apparatus 10, the hydraulic pressure control apparatus 10 produces the solenoid pressure from one of the branched line pressures, and using the solenoid pressure as a pilot pressure, produces the clutch pressure from the other branched line pressure.

If the clutch pressure, which is produced in the foregoing manner, is lower than the threshold pressure, the relief valve 46 remains closed. On the other hand, if the clutch pressure becomes equal to or greater than the threshold pressure, the spherical valve element 48 is lifted off of the valve seat 52, thereby opening the relief valve 46. As a result, the working oil is discharged from the relief hole 108. Accordingly, the working oil is prevented from being applied to the clutch under a pressure that is equal to or greater than a predetermined pressure, thereby protecting the clutch from undue damage.

The present invention is not limited to the above embodiment. Rather, various changes and modifications may be made to the embodiment without departing from the scope of the present invention.

For example, the working oil, the pressure of which is regulated by the hydraulic pressure control apparatus 10, may be supplied to other devices than a clutch. More specifically, the pressure-regulated working oil may be used as an actuating oil for pulleys that are used in continuously variable transmissions (CVTs).

What is claimed is:

1. A hydraulic pressure control apparatus comprising:
a working oil passage including an inlet port;
a first pressure regulating valve configured to reduce an initial oil pressure of a working oil introduced from the inlet port to a reduced oil pressure;
a single solenoid-operated valve supplied with an electric current and the reduced oil pressure reduced by the first pressure regulating valve, the single solenoid-operated valve configured to convert the reduced oil pressure into a solenoid pressure in accordance with the electric current supplied to a single solenoid of the single solenoid-operated valve; and
a second pressure regulating valve supplied with the solenoid pressure from the solenoid-operated valve, the second pressure regulating valve converting the initial oil pressure of the working oil introduced from the inlet port into an actuating pressure in accordance with the solenoid pressure, wherein:
the first pressure regulating valve, the single solenoid-operated valve, and the second pressure regulating valve are spool valves formed in a single body including the working oil passage;
a first valve hole, a second valve hole, and a third valve hole, axes of which are arranged in parallel along a horizontal direction, are formed in the single body, and a first valve rod of the first pressure regulating valve, a second valve rod of the single solenoid-operated valve, and a third valve rod of the second pressure regulating valve are accommodated reciprocally in each of the first valve hole, the second valve hole, and the third valve hole;
the single solenoid is exposed from an end of the second valve hole;
the first valve hole is interposed between the second valve hole and the third valve hole, and the first pressure regulating valve is arranged between the single solenoid-operated valve and the second pressure regulating valve, and adjacent to the single solenoid-operated valve; and
the single solenoid exposed from the end of the second valve hole extends parallel to the third valve rod housed in the single body.

2. The hydraulic pressure control apparatus according to claim 1, wherein plural fastener insertion holes are formed in the single body, plural fasteners are inserted in to the plural fastener insertion holes for fastening the single body to a given member, and a distance between the fastener insertion holes in a vicinity of the first valve hole and the third valve hole is smaller than a distance between the fastener insertion holes in a vicinity of the second valve hole.

3. The hydraulic pressure control apparatus according to claim 1, wherein:
an outlet passageway configured to release the working oil under the actuating pressure from the third valve hole, and an outlet port, which is contiguous with a downstream side of the outlet passageway and opens on an end face of the single body, are formed in the single body; and
the outlet passageway is formed in a straight line extending from the outlet port in a thicknesswise direction of the single body, and is perpendicular with respect to the third valve hole.

4. The hydraulic pressure control apparatus according to claim 1, wherein:
an inlet passageway contiguous with a downstream side of the inlet port extends in a straight line in a thicknesswise direction of the single body, an oil passageway is arranged in the single body, the oil passageway has defined therein a first valve hole line pressure inlet and a third valve hole line pressure inlet, the first valve hole line pressure inlet communicates with the inlet passageway and is configured to introduce the working oil as an initial oil pressure to the first valve hole, and the third valve hole line pressure inlet is configured to introduce the working oil as the initial oil pressure to the third valve hole;
the inlet passageway and the oil passageway communicate via a communication passageway, and the communication passageway is inclined with respect to the thicknesswise direction of the single body; and a filter is arranged in the inlet port, and an orifice is arranged in the communication passageway.

5. The hydraulic pressure control apparatus according to claim 1, further comprising an oil passageway provided in the single body, in which there are defined a first valve hole outlet configured to release the working oil having the reduced oil pressure out from the first valve hole, and a second valve hole inlet configured to introduce the working oil, which is released out from the first valve hole outlet, into the second valve hole.

6. The hydraulic pressure control apparatus according to claim 5, wherein the first valve hole outlet and the second valve hole inlet are arranged in the oil passageway, and the oil passageway is formed in a linear shape.

7. The hydraulic pressure control apparatus according to claim 1, further comprising an oil passageway provided in the single body, wherein in the oil passageway there are defined a second valve hole outlet configured to release the working oil under the solenoid pressure out from the second valve hole, and a solenoid pressure inlet configured to introduce the working oil, which is released out from the second valve hole outlet, into the third valve hole.

8. The hydraulic pressure control apparatus according to claim 1, wherein the first pressure regulating valve is arranged immediately adjacent to the single solenoid-operated valve in the single body.

* * * * *